United States Patent [19]

Watanabe

[11] 4,150,831
[45] Apr. 24, 1979

[54] TOY RECORD PLAYER

[75] Inventor: Katsumi Watanabe, Kawasaki, Japan

[73] Assignee: Yugen Kaisha Watanabe Kenkyusho, Japan

[21] Appl. No.: 838,808

[22] Filed: Oct. 3, 1977

[51] Int. Cl.² ............................................. G11B 17/06
[52] U.S. Cl. .............................. 274/15 R; 274/9 RA; 274/10 S
[58] Field of Search ............... 274/10 S, 15 R, 9 RA, 274/9 R, 1 A, 1 R

[56] References Cited

U.S. PATENT DOCUMENTS

| 2,621,047 | 12/1952 | Carreau | 274/1 R |
| 2,967,715 | 10/1961 | Black et al. | 274/1 S R |
| 3,073,603 | 1/1963 | Hansen | 274/10 S |
| 3,383,114 | 5/1968 | Ryan | 274/9 RA |
| 3,823,946 | 7/1974 | Nakajima | 274/1 A |
| 4,022,478 | 5/1977 | Stewart | 274/10 S |

*Primary Examiner*—Richard E. Aegerter
*Assistant Examiner*—John W. Shepperd
*Attorney, Agent, or Firm*—Basile and Weintraub

[57] ABSTRACT

A toy record player having an upwardly biassed, vertically moveable shaft, the upper end of which defines a push button for starting the player and which, also, is a record holder for holding and rotating a record disc. The record disc has a plurality of recording grooves on its lower face and carries marks representing the starting position of respective recording grooves on its upper face. A stylus point, which indicates the position of a tone arm, is carried thereby. The stylus is upwardly directed to confront the lower face of the record disc. Depression of the push button closes a circuit for a driving motor as well as lowering a record disc into engagement with the stylus. As the tone arm is driven to the final position of sound reproduction, it presses a latch to disengage the latter from a circumferential groove, so that the shaft is allowed to be returned upwardly, by the bias, to reset the player to its starting condition.

7 Claims, 6 Drawing Figures

TOY RECORD PLAYER

BACKGROUND OF THE INVENTION

1. Field of the Invention

The present invention relates to a toy record player of the type having a housing on which a record disc is mounted for reproduction. More particularly, the invention is concerned with a toy record player in which a reproduction system adapted for reproduction of selected one of a plurality of recording grooves is started by an axial movement of a shaft and which is reset to the starting condition automatically when the reproduction is over, whereby the structure is made compact and easy to handle, and the toy is rendered more attractive.

2. Prior Art

Conventionally, toy record players have been provided which reproduce the sound of a selected one of a plurality of recording grooves formed in a record disc. This type of toy record player is, preferably, constructed and designed to provide an operation which is as simple and safe as possible, and to include an automatic returning of the tone arm.

Unfortunately, the size of present or conventional toy record players have been unacceptably large. This is because the mechanism for fitting the stylus into the recording groove, electric switches, disc-supporting mechanism and other constituents are separately designed and installed within the record player, thereby occupying too large a space, as a whole.

Recently, there has been an increasing demand for minimizing the size of toy record players and which, also, includes simplified operation and handling.

From the view point of minimizing the size of the player, the electric starting switch must be installed at a position, whereby the handling of the switch may be made without hindrance from the record disc mounted on the housing. Thus, in those toy record players having a small housing, the upper face thereof is covered almost entirely by the record disc when the latter is mounted thereon, so that the starting switch is usually installed at a side of the housing. Alternatively, the switch is installed at a small area not covered by the disc on the upper face. However, when the switch is provided at a side of the housing, the compact and light weight record player has to be held by one hand, so as not to move, while the lateral switch is operated by the other hand. This manner of operation is considerably troublesome since it is difficult to perform because of instability in the manipulation thereof. This results in the touching of the record disc thereby displacing the selected recording groove from the stylus.

Where the switch is installed on a small area on the upper face of the housing, it is not necessary to manipulate the player by both hands. However, since the switch is located in close proximity to the record disc, there still is the fear that the record disc is accidentally touched by hand to displace the recording groove from the stylus.

Thus, in those toy record players of a type having a record disc provided with a plurality of grooves and adapted to be installed on the housing, it is highly desirable to make the size and weight small enough, without deteriorating the maneuverability thereof.

Even though the present invention does not concern toy record players in which the record disc is enclosed by a housing, even when they are intended for selection of recording grooves, some of this type of toy record player utilizes axial movement of the record disc for bringing it into and out of engagement with the stylus. This type of player requires, however, a rod for pressing the record disc, as well as mechanisms associated with the rod, which are entirely unacceptable for reducing the size of the type of record player under consideration herein.

In U.S. Pat. No. 3,017,187 and Japanese Utility Model Publication No. 6100/1969 there is disclosed, respectively, a toy record player in which a record disc, having a plurality of recording grooves, is adapted to be housed by a doll or a housing, with the latter reference teaching a knob having arrow signs adapted to be rotated for selecting the recording groove. This type of player provides an impression entirely different from that provided by a player on which the disc is mounted on the housing. In addition, in this type of player, the over-all size inevitably becomes large, because the tone arm has to be moved to and from the recording surface, for bringing the stylus into and out of engagement with the recording groove. This movement of the tone arm can be performed only by an additional or specific mechanism for actuating the tone arm, or by a combination of a pulling cord adapted to lift the tone arm and an expensive spring motor capable of imparting a torque to the record disc.

Thus, it is to be appreciated that heretofore there has been no compact toy record player for mounting thereon a record disc having a plurality of recording grooves, for a selective reproduction of one of these grooves.

OBJECTS OF THE INVENTION

It is, therefore, an object of the present invention to provide a toy record player adapted to mount thereon a record disc, the disc having a plurality of recording grooves, the player selectively reproducing the sound of one of these record grooves.

It is another object of the invention to improve the maneuverability of the toy record player of the type described.

It is still another object of the invention to reduce the size of the toy record player of the type described.

It is still further object of the invention to provide a toy record player of the described type, in which an accidental or eventual displacement of the selected recording groove from the stylus is completely avoided.

SUMMARY OF THE INVENTION

According to the invention, there is provided a toy record player having a housing on which a record disc having a plurality of recording grooves is to be mounted. A shaft for carrying and driving the record disc has an upper end portion which defines a dual role of holding the record disc and of a push button for starting the player. The upper portion of the shaft may carry the record disc detachably or integrally. The shaft is disposed in the housing and extends vertically upwardly therefrom. The shaft is biassed upwardly, so as to be pressed downwardly against the biassing force, when the push button portion of the shaft is depressed.

The record disc is mounted detachably or fixedly around the push button provided or formed at the upper end of the shaft and axially moves therewith, when the record disc is moved down toward the tone arm, which carries an upwardly directed stylus, the push button is depressed and moved downwardly along with the shaft. This brings the recording groove formed in the lower face of the record disc into engagement with the stylus. The tone arm is pivotally supported and normally biassed toward the starting position of sound reproduction. The record disc has a plurality of recording grooves in which recorded are different dialogues or musics. Marks in the form of letters and pictures corresponding to respective recording grooves are provided on the upper face of the record disc, at positions corresponding to the starting positions of respective recording grooves.

A stylus point is formed on the housing, at a suitable place on the latter, with which the marks on the record disc is to be aligned for putting the corresponding recording groove into engagement with the stylus. Thus, the stylus point is located at a position corresponding to the tone arm which is laid beneath the lower face of the record disc.

Switch contacts are disposed beneath the push button, and are kept apart from each other when the push button is not depressed. The switch contacts are adapted to be pressed to make contact with each other, by the lower portion of the push button. When the push button is depressed to lower the record disc to bring the recording groove into engagement with the stylus, the contacts are pressed to close an electric circuit which energizes a motor which drives the push button along with the record disc.

The energized condition is maintained by a latch which is resiliently pressed onto the peripheral surface of the shaft. The latch is received or engaged by a circumferential groove formed in the peripheral surface of the shaft, when the shaft is depressed. The latching of the shaft at its lower position acts against the upward biassing force normally exerted thereon. Since the circumferential groove extends horizontally, the rotation of the shaft is never hindered by the latch.

When the sound reproduction is over and the tone arm has been guided to the final position of the reproduction, the tone arm presses against the latch to force it out from the circumferential groove. The pressing of the latch by the tone arm may be effected directly, or indirectly, through a separately provided push rod. Therefore, the latch is disengaged from the circumferential groove to release the shaft, so that the latter is allowed to be returned upwardly by the biassing force, along with the push button and the record disc. Consequently, the stylus is disengaged from the recording groove which allows the tone arm to return to its starting position.

In the toy record player of the invention all mechanisms relating to the operation, from the starting to the completion of the reproduction, including the automatic returning of the tone arm, are associated with the shaft which carries the record disc. This arrangement reduces the size of the whole structure. In addition the toy record player of the invention can be started simply by one push button thereby avoiding the displacement of the selected recording groove from the stylus.

For a more complete understanding of the present invention reference is made to the following detailed description and accompanying drawing. In the drawing like reference characters refer to like parts throughout the several views, in which:

DESCRIPTION OF THE PREFERRED EMBODIMENTS

Figure 1:
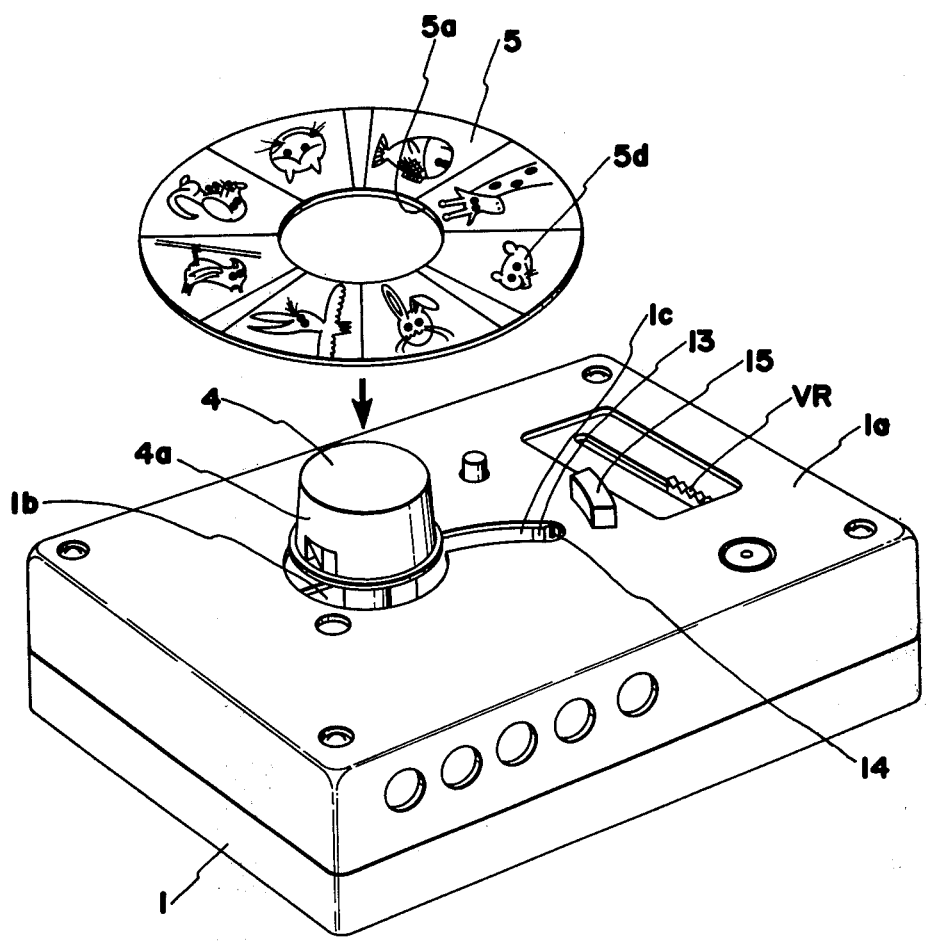
FIG. 1 is a perspective view of a toy record player depicting a first embodiment of the invention and wherein a record disc is replacably mounted on a record holder.

With reference to the drawing, FIGS. 1-4 show a record player defining a first embodiment of the present invention in which a record disc is detachably or replaceably mounted on the player replaceably with other discs. Since the description of the first embodiment substantially covers the second embodiment, the following description is focussed mainly on the first embodiment.

The record player hereof comprises a housing 1 having a top panel or cover 1a fixed to the housing 1, which covers the inner mechanisms disposed in the housing 1.

The cover 1a has a bore 1b for passing a push button and a guiding slot 1c which merges into the bore 1b, the slot 1c guiding a reproducing needle or stylus. The push button 4 which, also, defines a record holder, upwardly extends from the housing 1 and emerges through the bore 1b. A stylus 14, which is carried by an arm 13 pivotally fixed to the housing 1, emerges through the guiding slot 1c. A stylus point 15, is disposed on the cover 1a near the outer end of the guiding slot 1c. The stylus point 15 guides the periphery of a record disc 5, when the disc is mounted on the player with its central bore 5a fitted around the push button 4.

The record disc 5 has a plurality of parallel recording grooves formed in its lower surface. The disc carries pictures of symbols 5d representing the starting position of respective recording grooves, on its upper face. The stylus point 15 indicates the position of tone arm which carries the stylus or needle 14.

Figure 2:
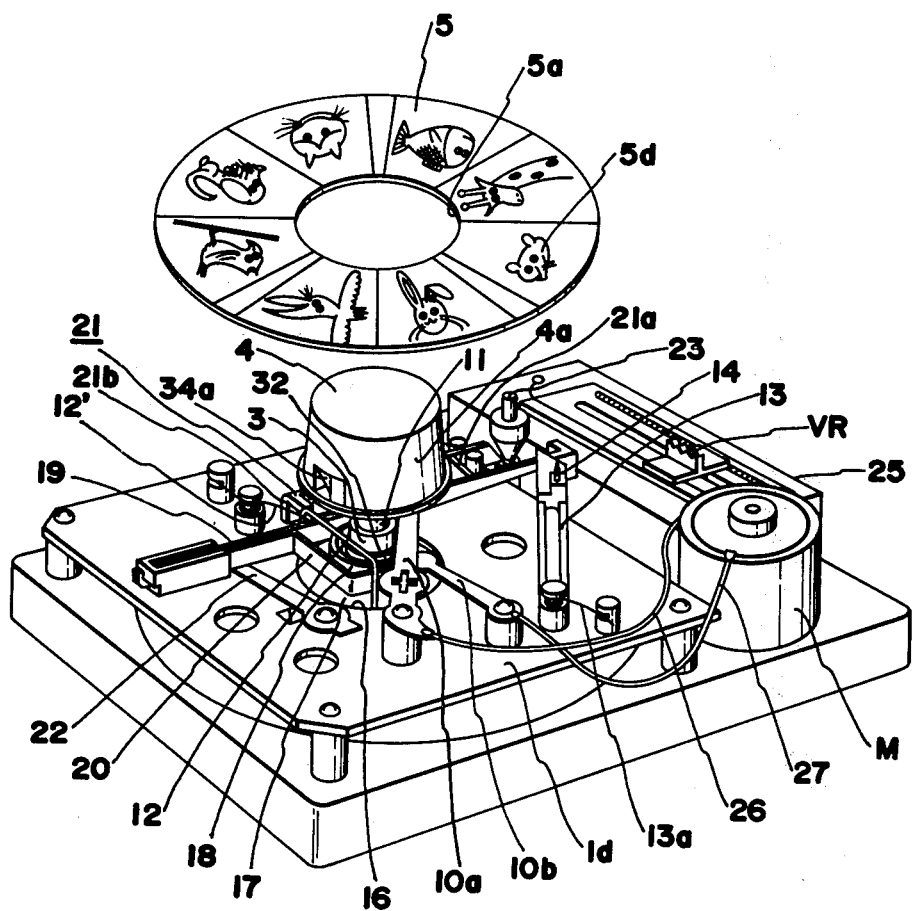
FIG. 2 is a perspective view of the toy record player as shown in FIG. 1, with its cover being removed to show the inner structure.

As shown in FIG. 2, the housing 1 includes an intermediate or carrier plate 1d which carries intermediate mechanisms necessary for the reproduction. The horizontally extending carrier plate 1d has a central communication bore 16 through which is projected to the upper side of the carrier plate a vibration core 18 of a speaker 17. The vibration core 18 has a tubular form, and is co-axial with a tubular shaft 3, the upper extremity of which defines the push button 4. The push button 4 is normally biassed upwardly, by means of a spring, as will be detailed latter.

The carrier plate 1d has mounted thereon a cantilevered sound-transmitting rod or bar 19 which extends across the central communication bore 16. The sound-transmitting bar 19 is normally biassed upwardly, by means of a spring 22, so as to resiliently engage a first side of the vibration core 18 of the speaker 17.

The sound-transmitting bar 19 comprises an L-shaped resilient arm 20 which is secured to the bar at one side thereof. The arm 20 enables the sound-transmitting bar 19 to contact a second or opposite side of the vibration core 18 of the speaker 17. This mode of engaging the sound-transmitting bar 19 with the vibration core 18 advantageously ensures a safe transmission of the reproduced sound, while permitting displacement of the sound transmitting bar 19 relative to the vibration core 18 and the speaker 17, derived from a structural reason. In other words, the sound transmission is not affected by the relative displacement of the members, relative to one another.

The tone arm 13 is pivotally mounted onto the carrier plate 1d. The tone arm carries, at end thereof, the upwardly directed sound reproducing stylus 14. The tone arm 13 is pivoted at its lower or other end to enable a swinging motion to and from the plane of the carrier plate 1d as well as slightly upwardly. The tone arm 13 slidably rests, at its portion behind the stylus 14, on the sound-transmitting bar 19. Thus, the reproducing vibration picked up by the reproducing stylus 14 is transmitted to the sound-transmitting bar 19, through the tone arm 13 which slides on the sound-transmitting bar 19 during its swing motion. The vibration is then further transmitted to the speaker 17, through the vibration core 18, so as to be amplified and transduced into the audible sound. The tone arm 13 is resiliently biassed upwardly, by the force of the spring 22, through the sound-transmitting bar 19.

The tubular shaft 3 carrying the push button 4 is provided, at its peripheral surface emerging from the vibration core 18, with a circular groove 11. A latch 12 is secured to the carrier plate 1d, and is pressed onto the peripheral surface of the tubular shaft 3. In the illustrated embodiment, the latch 12 comprises an inverted U-shaped wire having both legs pivoted at their lower ends to the lower surface of the carrier plate 1d, and projecting upwardly through the central communication bore 16. The latch 12 is resiliently biassed into engagement with the peripheral surface of the tubular shaft 3, by means of a spring 12'. It is to be understood that this construction of the latch so-described is merely illustrative, and any other member such as a resilient plate or a wire may be used to define the latch 12.

Referring, again, to the drawing, an actuating link 21 having at its ends projections 21a and 21b, respectively, is held between the latch 12 and the final reproducing position of the tone arm 13. The arrangement is such that the tone arm 13 presses against and displaces the actuating link 21, as the stylus 14 of the tone arm 13 is guided to the final position along the recording groove. This, in turn, presses the latch 12 against the biassing force of the spring. Thus, the tone arm 13 is so positioned as to press or engage the latch, through the actuating link 21, when it reaches the final position in the course of the reproduction. In the drawings, numeral 13a denotes a reset spring for the tone arm. The actuating link 21 is further extended beyond the final reproducing position. The extended end of the actuating link 21 is tapered for engagement with a conical surface of a manual switch rod 23.

Switch contacts 10a and 10b are disposed beneath the push button 4, but are vertically, axially spaced from each other. However, when the push button is depressed, the contact 10a is lowered to come into contact with the contact 10b.

A motor M is mounted on the housing 1. The motor M is connected to batteries, housed by a battery magazine 25 which, is, also, secured to the housing, through lead wires 26, 27 and the contacts 10a, 10b. A variable resistance VR controls the revolution speed of the motor M.

Figure 3:
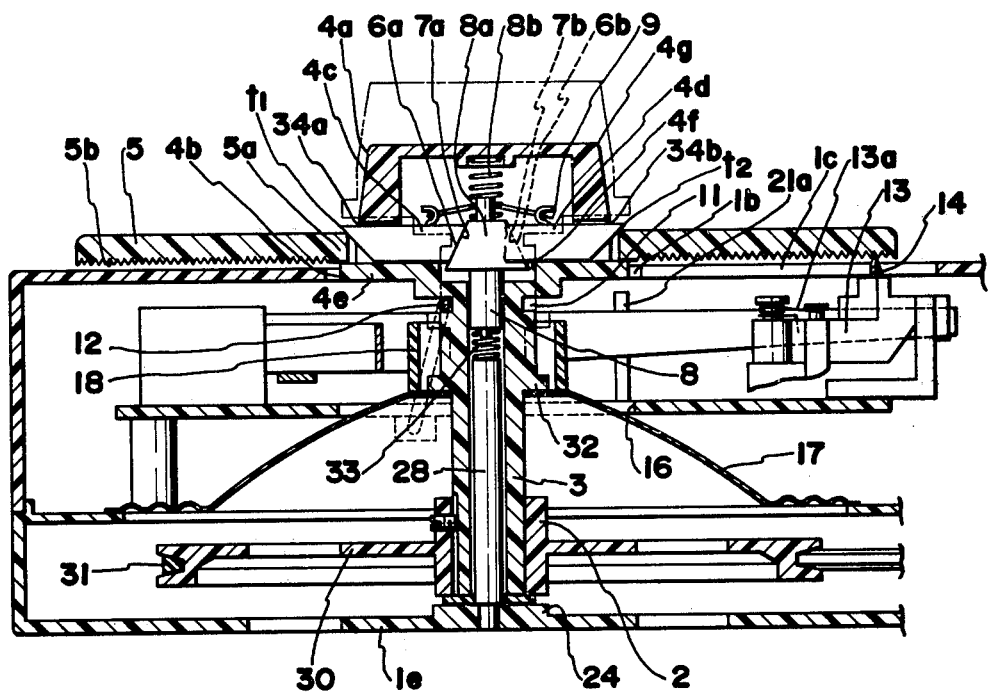
FIG. 3 is a cross-sectional view of the central portion of the toy record player of the first embodiment, but with the shaft unsectioned.

Referring to FIG. 3, it will be seen that the speaker 17 is mounted to lie beneath the carrier plate 1d of the housing 1, with its diverging end directed downwardly. The vibration core 18 formed on the converging end of the speaker 17 projects upwardly through the central communication bore 16 of the carrier plate 1d. A center pin 28 is provided on the bottom plate 1e of the housing and extends to an intermediate height of the housing 1. The lower end of the center pin 28 is received by a boss 24 formed unitarily with the bottom plate 1e of the housing 1. A tubular driving shaft 2 is fitted around the center pin 28, for free rotation on the boss 24. The driving shaft 2 carries a pulley 30 of a considerably large diameter which is connected to the shaft of the motor M (FIG. 2) through a belt 31, so as to be driven at a reduced speed by the motor M.

The tubular shaft 3 is fitted within and concentric with the driving shaft 2 for unitary and simultaneous rotation therewith. The center pin 28 is inserted into the tubular shaft 3 to the intermediate depth thereof to hold and maintain the tubular shaft 3 coaxial with the driving shaft 2. The tubular shaft 3 has a peripheral flange at its intermediate height, and the circumferential groove 11 is formed at its upper journal portion.

In FIG. 3 there is shown the push button 4 depressed downwardly to bring the circumferential groove 11 down to the height of the latch 12 to receive the latter, so that the tubular shaft 3 is latched to preserve the push button 4 in the depressed position.

An actuating piece 8 is inserted from the top opening of the tubular shaft 3, i.e., from the lower plate 4e of the push button 4 in opposition to the upper face of the center pin 28. The actuating piece 8 is biassed upwardly by means of a coiled spring 33 acting between itself and the upper end of the center pin 28. The bottom plate 4e of the push button 4 presents at its peripheral portion a supporting surface 4b for the record disc 5 and is recessed at its center to provide a seat groove 4f. The actuating piece 8 has a unitary head 8a having side tapered surfaces 6a, 6b and vertical front and rear surfaces. Thus, the actuating piece 8 is allowed to move vertically axially, being guided by the front and the rear walls of the recessed seat groove 4f, but is locked against rotation relative to the push button 4.

Record pressing pieces 4c, 4d are guided on the lower plate 4e of the push button 4 so as to traverse the actuating piece 8, i.e., be movable along the plane of rotation of the push button 4. Further, a frusto-conical cover 4g is provided to cover the record pressing pieces 4c, 4d. The cover 4g, therefore, has a conical rotary peripheral surface 4a. At the lower end of this rotary surface, are a pair of windows 34a, 34b, in symmetry with each other, and with respect to the center of the push button 4. The record pressing pieces 4c, 4d have downwardly tapered ends t1, t2 which project outwardly through the windows 34a, 34b.

Figure 4:
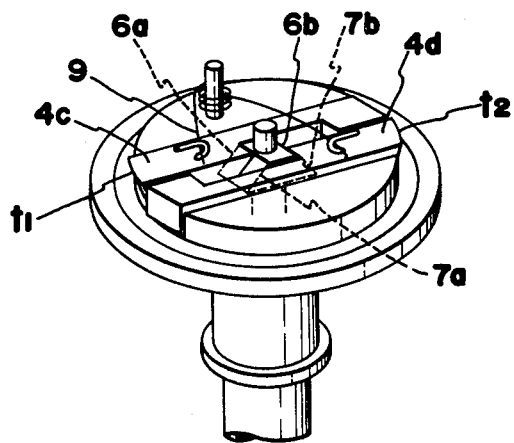
FIG. 4 is a perspective view of a record holder in accordance with the present invention, with its cover being removed.

As clearly shown in FIG. 4, the record pressing pieces 4c, 4d are guided by a guide which is formed by cutting the central thickened portion of the lower plate 4e. The record pressing pieces 4c, 4d are both notched at their intermediate portions to present downwardly tapered surfaces 7a, 7b adapted to slidingly engage the upwardly tapered surfaces 6a, 6b of the head 8a of the actuating piece 8.

As shown in FIG. 3, a coiled spring 8b is provided on the head 8a of the actuating piece 8. The spring 8b is compressed between the head 8a and the upper innner surface of the cover 4g of the push button 4, so as to support the latter, as well as to resiliently press or bias the actuating piece 8 downwardly. This enables the head 8a to be seated on the bottom of the seat groove 4f. Thus, the push button 4 is always biassed upwardly, along with the tubular shaft 3, when the latch 12 is not retained by the circumferential groove 11 of the tubular shaft 3. Normally, the latch 12 engages the lower flange 32 (FIG. 2) to prevent the push button 4 from being axially dropped. Then, as will be seen from FIG. 4, the head 8a of the actuating piece 8 is seated on the seat groove 4f, so that its tapered surfaces 6a, 6b do not act on the tapered surfaces 7a, 7b of the record pressing pieces 4c, 4d.

On the other hand, the record pressing pieces, 4c, 4d are normally inwardly biassed by a spring 9, so that the ends thereof t1, t2, respectively, may not project outwardly. This results in a sliding contact of the tapered surface 7a, 7b of the record pressing pieces 4c, 4d with the tapered surfaces 6a, 6b of the head 8a of the actuating piece 8. Therefore, when there is no downward pressing force applied to the push button 4, the push button 4 is kept at the raised position, being supported by the coiled spring 8b, so that the actuating piece 8 does not project into the push button 4, and the tapered surfaces 6a, 6b of the head do not force the record pressing pieces 4c, 4d, so that the ends t1, t2 of the latter do not project out of the windows 34a, 34b.

In operation, the record disc 5 is mounted, as shown in FIG. 3, with its face having record grooves 5b directed downwardly, in such a manner that its central bore 5a engages the rotary peripheral surface 4a of the push button 4. By pressing the push button 4 downwardly, with the record disc 5 supported by the supporting surface 4b, the switch contacts 10a, 10b come to close the circuit to start the motor M. Consequently, the push button 4 is rotated and, at the same time, the record pressing pieces 4c, 4d are forced out by the wedging action performed by the tapered surfaces 6a, 6b, 7a and 7b, because the actuating piece 8 comes relatively up into the push button 4, so that the ends t1, t2 of the record pressing pieces come to cooperate with the supporting surface 4b in cramping the edge of the central bore 5a of the record disc therebetween. In addition, the tubular shaft 3 is also lowered so as to bring the circumferential groove 11 to the position for receiving the latch 12, to thereby lock the tubular shaft 3 against upward returning movement. However, the rotation of the push button 4 and the tubular shaft 3 is never interrupted by the latch 12.

The push button, thus, fixes the record disc 5, and brings the stylus into engagement with the record groove 5b. As the record disc is rotated, the stylus 14 and the tone arm 13 are guided to the final position of the reproduction. As the tone arm 13 reaches the final position, it pushes the projection 21a of the actuating link 21, which in turn pushes the latch, through the projection 21b, so as to disengage the latch 12 from the circumferential groove 11. Consequently, the tubular shaft 3 is unlocked and is returned to the raised position by the force of the spring 8b. Also, the contacts 10a and 10b are separated to electrically connect the motor M from the power source. At the same time, the record pressing pieces 4c, 4d are retracted into the push button 4, because the pressing force has been dissipated thereby releasing the record disc. Consequently, the record disc 5 is moved upwardly to release the stylus 14, so as to allow the tone arm 13 to return to the starting position of reproduction.

Figure 5:
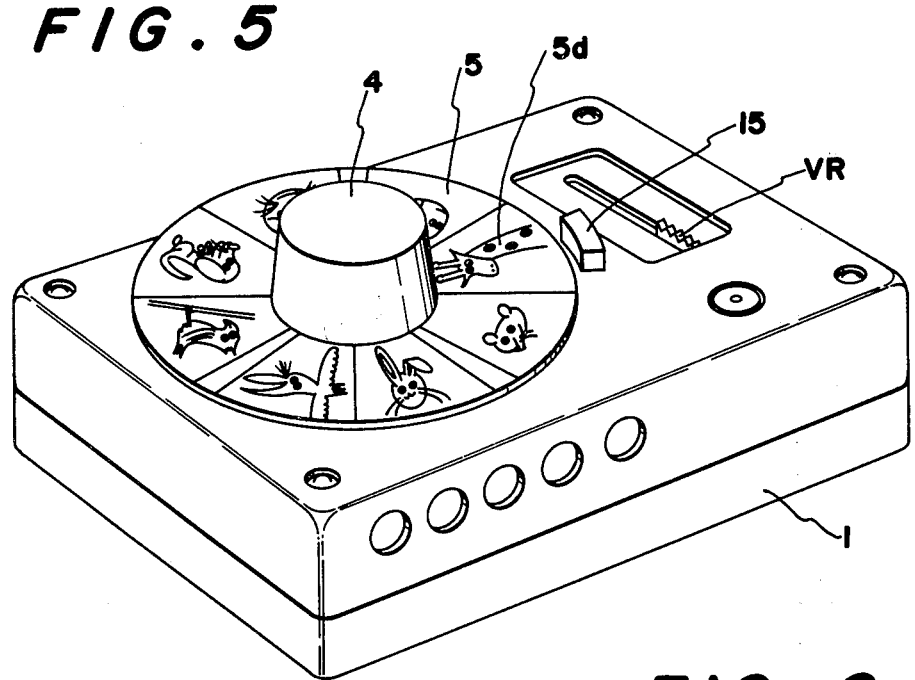
FIG. 5 is a perspective view of an alternate or second embodiment of the invention in which a record disc is secured integrally with the record holder hereof.
Figure 6:
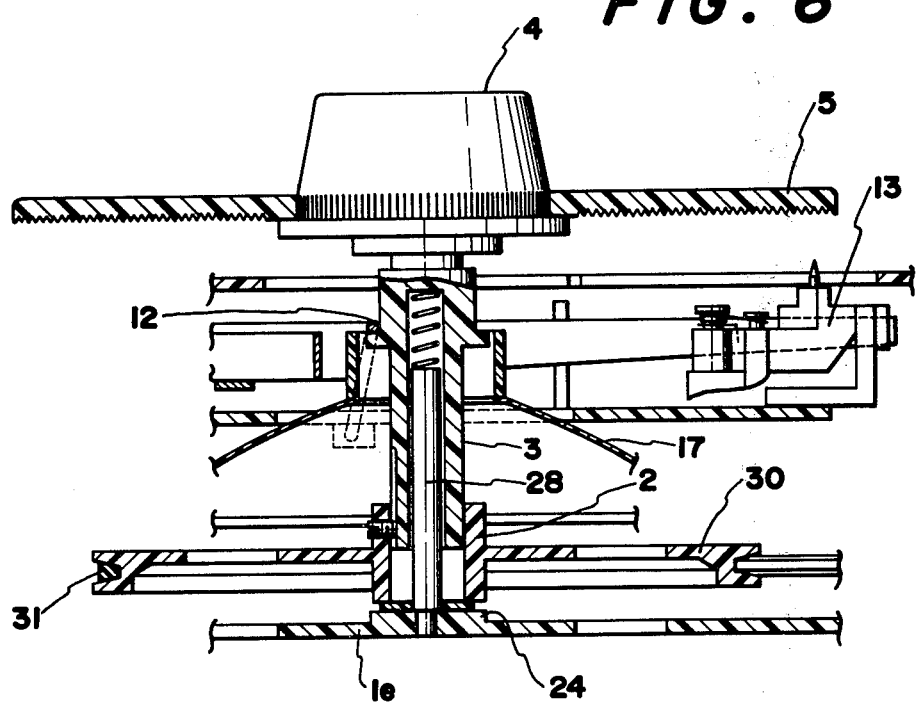
FIG. 6 is a broken cross-sectional view showing the portion at which the record disc is attached to the record holder hereof.

Referring now to FIGS. 5 and 6 there is shown therein another embodiment of the invention. Herein, the record disc 5 is permanently fixed to the push button 4 which, also, defines the record holder. In other words, herein, the record disc 5 is not intended for replacement. In this embodiment, the record disc 5 is closely fitted to the peripheral surface of the push button 4. Therefore, the push button 4 does not need the record pressing pieces nor the tubular shaft as used in the foregoing embodiment.

In accordance with this embodiment, the shaft 3 has a tubular form, as is the case of the foregoing embodiment, and is, also, biassed upwardly by means of a coiled spring 33. At the same time, the shaft 3 is adapted to be driven by a driving shaft 2.

As noted, in all other respects this embodiment of the invention is identical to the first embodiment.

It should be noted, though, that this embodiment may be modified to allow the replacement of the record disc, by providing means for adjusting the fixing of the disc to the push button, i.e., means for adjusting the degree of frictional engagement between the record disc and the push button. For instance, a leaf spring may be provided to act between the record disc and the push button.

Having, thus, described the invention what is claimed is:

1. In a toy record player of the type wherein a record disc having a plurality of recording grooves formed in its lower face and carrying marks representing the recording grooves at its upper face is adapted to be mounted on the record player, the record player including a housing, a tone arm pivotally mounted onto the housing, a stylus carried by the tone arm, one of the marks being alignable with the stylus point to enable the stylus to engage a selected one of the recording grooves for performing sound reproduction, and further wherein the sound reproduction is stopped automatically when the stylus has been driven to the final point of the recording groove, the tone arm returning automatically to the starting position after the stylus reaches the final point of the recording groove, the improvement which comprises:
    (a) a motor disposed in said housing and being in electrical communication with a source of energy therefor,
    (b) an upwardly extending shaft disposed in the housing and having a peripheral groove formed therein, the shaft having one end emerging therefrom, the emerging end comprising an upwardly biassed axially moveable push button, the push button defining a record holder for the record disc, the push button being operatively connected to the motor to drive the push button and the record disc held thereby,
    (c) means for biassing the pushbutton,
    (d) a normally open switch interposed the motor and the source of energy, the switch comprising a pair of switch contact disposed in the housing beneath the push button, the contacts contacting each other when the push button is axially depressed against its bias to close the switch to complete the electric circuit for energizing the motor, the contact being separated to open the switch to thereby open the circuit when the push button is axially moved in response to its upward bias;

(e) a latch disposed in said housing and being normally biassed into sliding contact with the shaft, the latch fitting into the peripheral groove of the shaft when the push button is axially depressed against the means for biassing to thereby latch the push button in the depressed position, and (f) an actuating link mounted in the housing proximate the tone arm and the latch, the tone arm acting against the actuating link when the tone arm reaches the final position of sound reproduction to press the link against the latch to disengage the latch from the peripheral groove.

2. A toy record player as claimed in claim 1, wherein:

(a) said shaft has a tubular form, the tubular shaft being rotatably supported by a center pin provided on a bottom plate of said housing and extending upwardly therefrom into said tubular shaft, and (b) the push button being supported and biassed upwardly by a coiled spring disposed on the top end of said center pin.

3. A toy record player as claimed in claim 1 wherein said push button comprises:

(a) a supporting surface for supporting said record disc along the plane of rotation thereof;

(b) record pressing pieces being capable of moving along the plane of rotation of said record disc and having ends opposing said supporting surface, the record pressing pieces cooperating with the supporting surface to clamp the record disc between the pieces and the supporting surface;

(c) an actuating piece disposed in said tubular shaft held for axial movement traversing said record pressing pieces, said actuating piece having tapered surfaces and adapted to press said pressing pieces outwardly along said plane of rotation, relatively, at said tapered surfaces, when the actuating piece is moved upwardly as a result of a depression of said push button;

(d) a spring adapted to bias said record pressing pieces radially inwardly, so as to bring the ends of the latter out of alignment with said supporting surface; and (e) a coiled spring adapted to bias the shaft and the push button upwardly and to resiliently bias said actuating piece downwardly.

4. A toy record player as claimed in claim 1, wherein said record disc and said push button are fixed to each other for unitary rotational and axial movements.

5. A toy record player as claimed in claim 4 wherein said record disc and said push button are frictionally, detachably fixed to each other.

6. A toy record player as claimed in claim 4 wherein said record disc and said push button are integrally formed together.

7. A toy record player as defined in claim 1 wherein said disc has recording grooves on both sides for sound reproduction.

* * * * *